May 2, 1939.  P. TISHKEN  2,156,323
CUT-OFF MACHINE
Filed Feb. 25, 1938  5 Sheets-Sheet 1
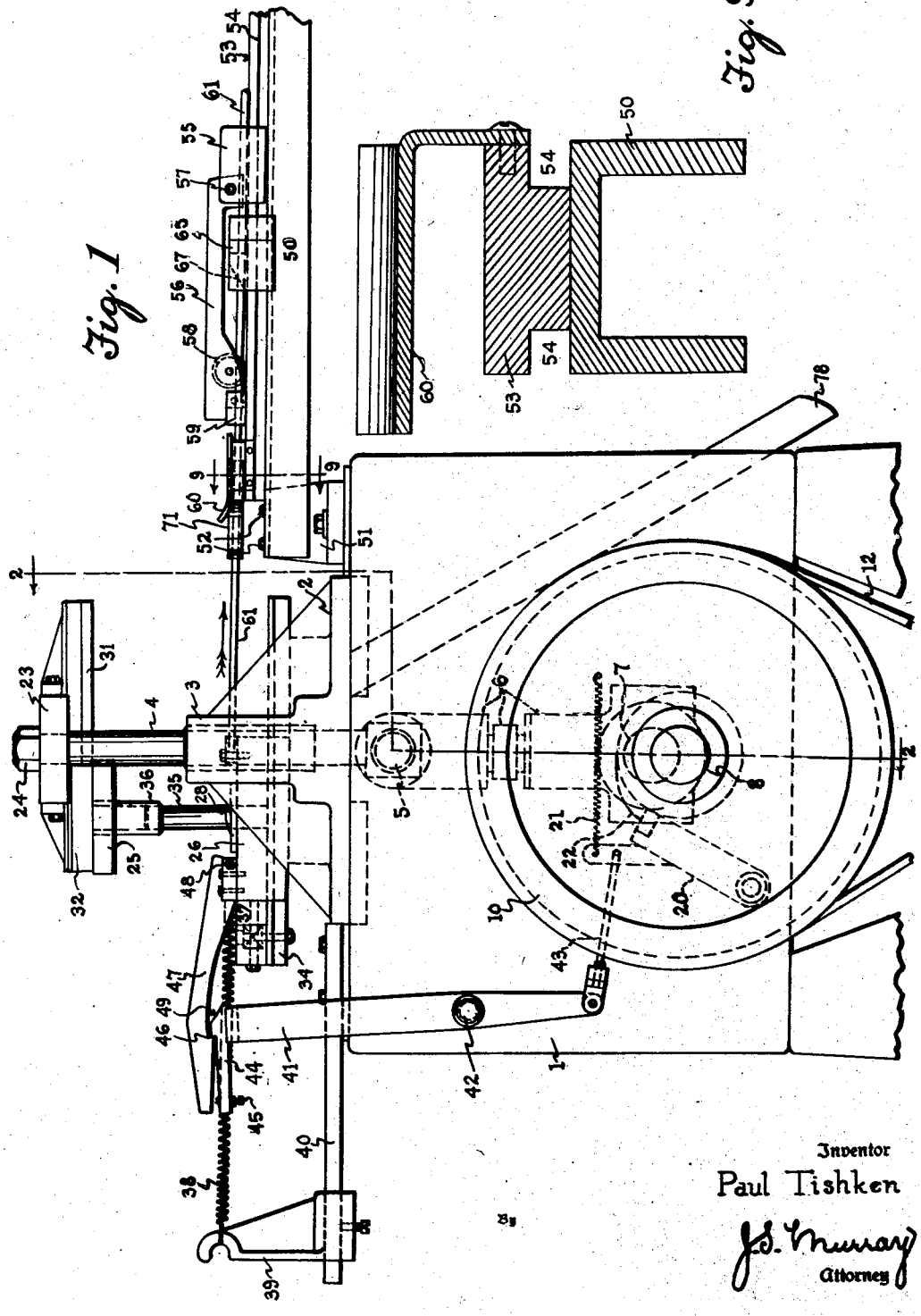
Inventor
Paul Tishken
J. S. Murray
Attorney May 2, 1939.  P. TISHKEN  2,156,323
CUT-OFF MACHINE
Filed Feb. 25, 1938   5 Sheets-Sheet 2

Inventor
Paul Tishken
J. S. Murray
Attorney

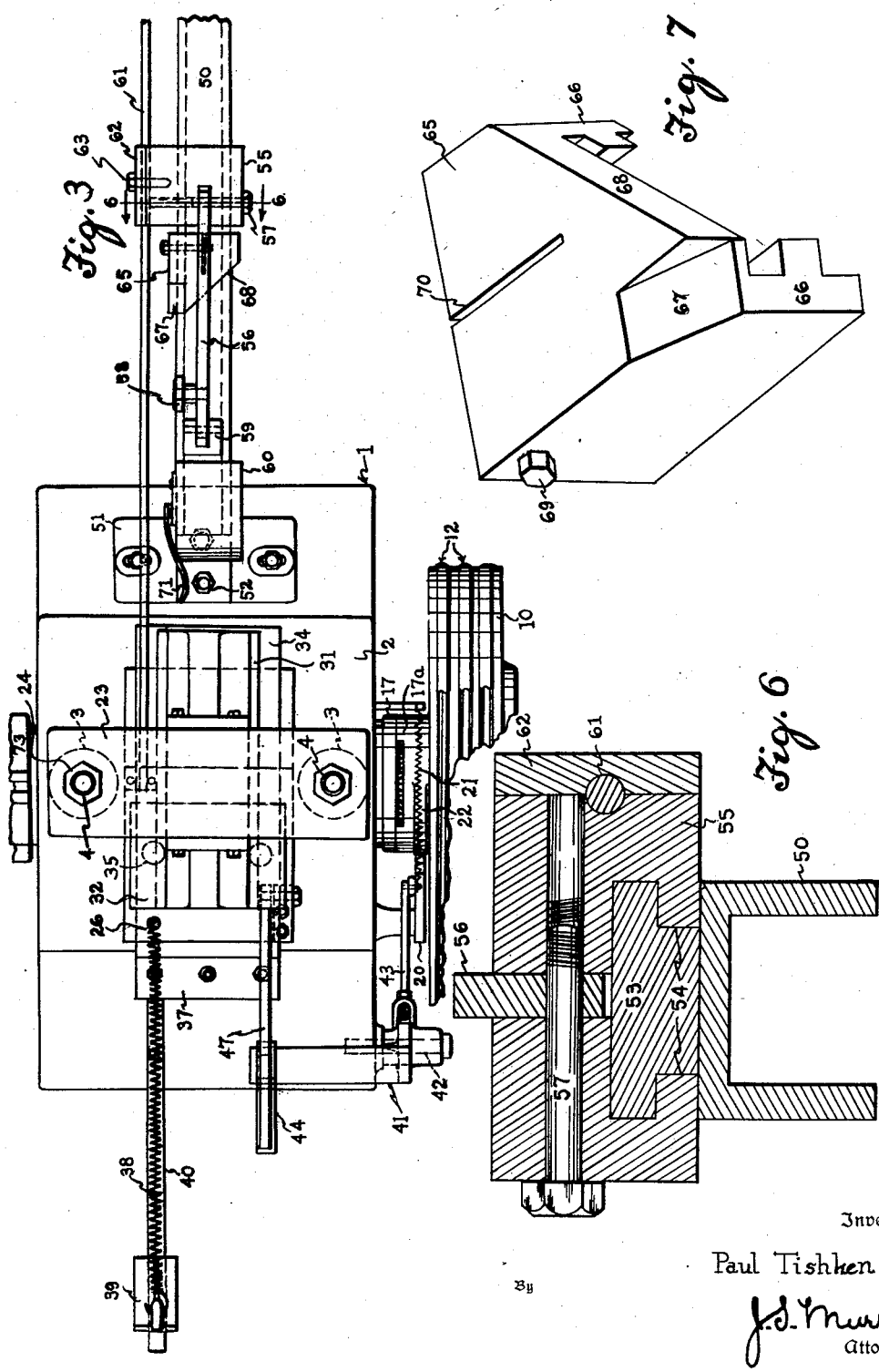

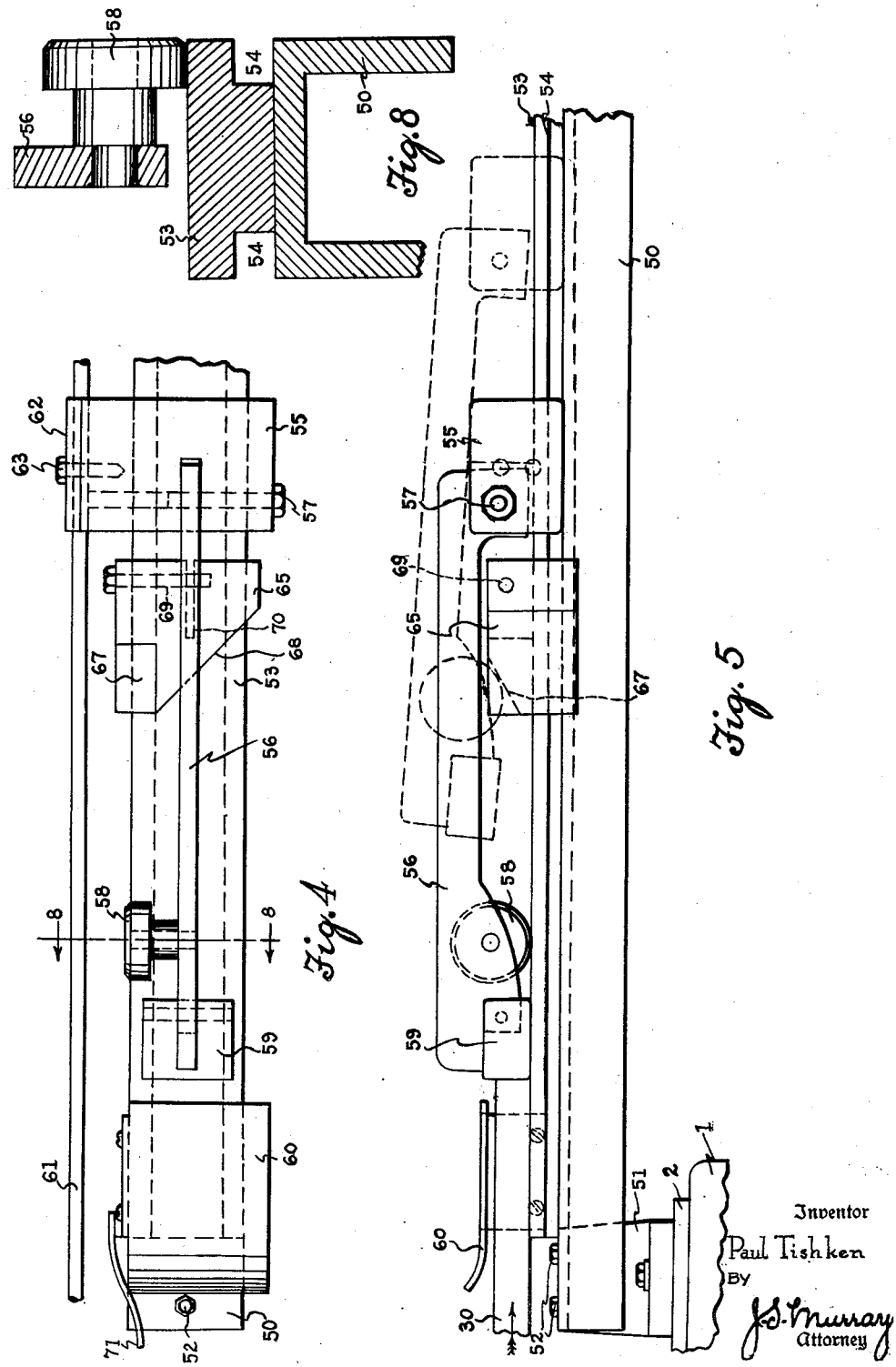

May 2, 1939.  P. TISHKEN  2,156,323
CUT-OFF MACHINE
Filed Feb. 25, 1938  5 Sheets-Sheet 5

Inventor
Paul Tishken
By J.S. Murray
Attorney

Patented May 2, 1939

2,156,323

UNITED STATES PATENT OFFICE 2,156,323

CUT-OFF MACHINE

Paul Tishken, Detroit, Mich.

Application February 25, 1938, Serial No. 192,484

15 Claims. (Cl. 164—48)

This invention relates to cut-off machines and particularly to machines for severing an advancing length of elongated stock without interrupting travel thereof.

An object of the invention is to adapt the shearing dies of a cut-off machine to undergo a limited sliding travel in unison with each other and with a length of advancing stock, while shearing the stock.

Another object is to adapt the shearing dies to be driven forward by and in unison with the advancing stock, during shearing of the stock.

A further object is to provide for cutting advancing elongated stock into accurately equal lengths by locating a bumper block or the like in the path of such stock, adapting such block for forward actuation by the stock, and employing such actuation to energize the trip mechanism of a clutch or other power control device to produce a shearing stroke of the cut off die or dies.

A further object is to adapt said bumper block to be located at selective distances beyond the shearing dies in the direction of stock travel, so as to afford selective control of the sheared lengths of stock.

A further object is to provide improved means for ejecting sheared lengths of advancing stock from a cut-off machine.

A further object is to adapt said bumper block to be automatically shifted from the path of the stock, as a shearing operation is completed, and thus afford the front end of the sheared stock engagement with a surface inclined to the path of stock travel, for deflecting such sheared length laterally, in ejecting it from the machine.

These and various other objects are attained by the construction hereinafter described and illustrated in the accompanying drawings, wherein:

Fig. 1 is a view of the improved machine in side elevation.

Fig. 3 is top plan view of the machine.

Fig. 4 is an enlarged top plan view of a portion of the machine, particularly showing parts adjustable on an elongated table to control the sheared length of the stock.

Fig. 5 is a side elevational view of the structure appearing in Fig. 4.

Fig. 6 is a cross section, taken on the line 6—6 of Fig. 3, showing a trip arm carrier and the table mounting the same.

Fig. 7 is a perspective view of a block adapted to present an angular surface to advancing severed stock, to eject it from the machine.

Fig. 8 is a cross section taken on the line 8—8 of Fig. 4, showing a roller and bumper block and an arm carrying the same.

Fig. 9 is a cross section taken on the line 9—9 of Fig. 1, showing the mounting of a stock guide on said table.

Figures 12, 13:
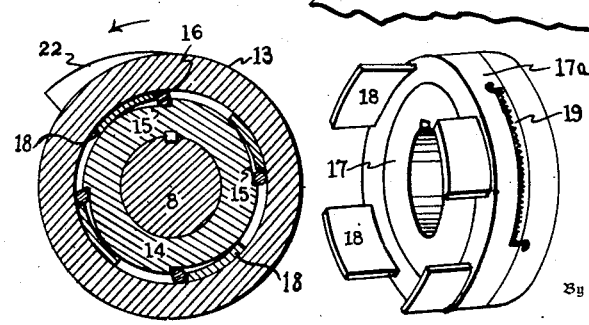
Fig. 12 is a cross sectional view, taken on the line 12—12 of Fig. 2, showing a clutch through which shearing operations are controlled.
Fig. 13 is a perspective view of a control ring for such clutch, and a collar carrying the ring.

In these views, the reference character 1 designates a rectangular casing, closed at its top by a cover plate 2. Integral with and upstanding from such plate is a pair of spaced slide bearings 3, mounting a pair of draw rods 4 for vertical reciprocation in unison. The rods 4 project upwardly and downwardly beyond the bearings 3, their lower ends being interconnected within the top portion of the casing 1 by a wrist pin 5. A connecting rod 6 (see Figs. 1 and 2), extending to said wrist pin from the crank 7 of a crank shaft 8, provides for reciprocatory actuation of the draw rods. The shaft 8 is horizontally journaled in opposite walls of the casing 1, preferably in bearings 9, interiorly formed on such walls. Exteriorly of the casing 1, a combined fly wheel and pulley 10 is mounted to rotate freely on the shaft 8, being preferably journaled on said shaft, through an anti-friction bearing, as is indicated at 11. When the machine is in use, the pulley 10 is continuously driven, as by a set of V-belts 12. The inner face of the pulley 10 is recessed to receive a clutch of any type controllable to limit actuation of the shaft by the pulley to a single revolution. Thus there is rigidly set into the pulley (see Fig. 2) a ring 13, coaxial with the shaft, such ring freely encircling a smaller ring 14, keyed to the shaft and having its peripheral face formed with angularly spaced pockets 15, each receiving a roller 16. Said pockets correspondingly vary in depth from end to end thereof, (see Fig. 12) the depth at the trailing ends of the pockets being adequate to afford the rollers 16 clearance from the ring 13, and the depth being progressively increased toward the leading ends of the pockets so that the rollers will bind between the inner and outer rings in approaching said leading ends. Between the pulley 10 and casing 1, a collar 17, keyed on the shaft 8, carries a clutch control ring 17a having arcuate lugs 18 projecting therefrom between the rings 13 and 14, as best appears in Figs. 12 and 13, said lugs so engaging the rollers 16 that a slight rotation of the control ring in a direction reverse to the drive, will shift the rollers from their binding and drive-establishing positions, into the deeper ends of the pockets 15, where they are without effect. Coiled springs 19, interconnecting the collar 17 and ring 17a, urge said ring rotatively toward its drive-establishing position. A clutch control arm 20, pivoted at one end thereof on the casing 1, (see Fig. 1) is urged at its other end into normal peripheral contact with the ring 17a by a coiled spring 21 and is consequently engageable by a lug 22 on the periphery of said ring to normally release the clutch and interrupt a drive to the shaft 8 by causing a shifting of the rollers to their ineffective positions. It will be readily understood that when the arm 20 is swung clear of the lug 22, the springs 19 will sufficiently advance the ring 17a in the direction of drive, to establish the rollers 16 in their driving positions.

Rigidly surmounting the draw rods 4 at a suitable elevation above the cover 2, is a head 23 clamped by nuts 24 upon shoulders formed on said rods. Said head and the cover 2 carry upper and lower die holders 25 and 26, mounting any suitable coacting dies. As shown, the upper die holder carries a shearing blade 27 and the lower holder carries paired dies 28, spaced for shearing coaction with the blade 27, when the latter is downwardly actuated. Preferably the dies 28 are set into a recess in the top face of the holder 26, and said holder is slotted, as indicated at 29, to accommodate the blade 27 as it completes its down-stroke.

Figure 10:
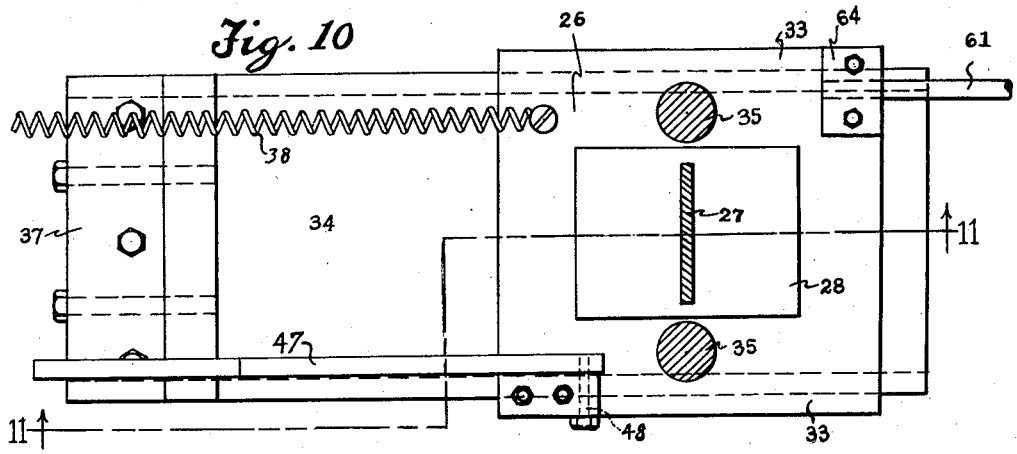
Fig. 10 is a top plan view, partly in section on the line 10—10 of Fig. 11, showing the lower die holder and its slide guide and the relation of the shearing blade thereto.
Figure 11:
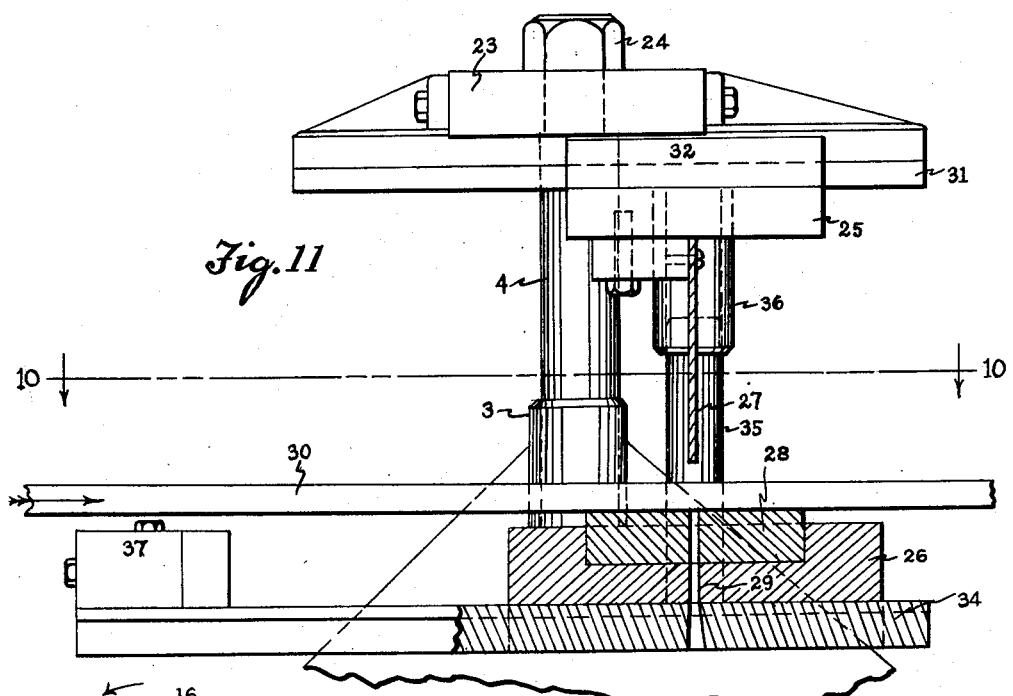
Fig. 11 is a sectional elevational view of the dies, die holders and their slide guides, taken on the line 11—11 of Fig. 10.

At 30 is indicated a length of advancing stock, adapted to be severed by coaction of the described dies, the direction of travel of such stock being indicated by arrows in Figs. 1, 10 and 11. Since it is an object of the invention to maintain travel of the stock during shearing thereof, the die holders 25 and 26 are adapted for a limited sliding actuation in the direction of stock travel. Thus secured to the lower face of the head 23 is a slide-guide 31, beneath which the die holder 25 engages, and on which it is mounted by a pair of guide bars 32 carried by the holder at opposite sides of the slide-guide and overhanging the latter. Similarly the holder 26 carries, at opposite margins thereof, depending guide bars 33 having portions underlying a slide-guide 34 attached to the cover 2. To assure travel of the two die holders in unison, while affording vertical actuation of the upper one, a pair of upstanding guide pins 35 are rigidly and oppositely mounted on the holder 26 near its lateral margins, and slidably fit within a pair of bushings 36, rigidly depending from the holder 25, said bushings being afforded a sliding travel on said pins at least equal to the working stroke of the blade 27. The die holders 25 and 26, in conjunction with the telescoping connection formed between such die holders by the pins 35 and bushings 36 may be regarded as a carriage for the dies.

Normally the sliding unit formed by the shearing blade 27, dies 28, and their holders 25 and 26, occupies a rear limiting position established by a stop block 37 mounted on the slide-guide 34, the die holder 26 being yieldably engaged with such block by a coiled spring 38, rearwardly extending from such holder. The rear end of such spring is anchored to a bracket 39 fixed on and upstanding from a rod 40, rigidly rearwardly projecting from the cover 2 (Figs. 1 and 3).

Upon forward sliding actuation of the die unit 27, 28, 25, 26, the initial travel thereof is utilized to trip the arm 20 clear of the lug 22, so as to let the clutch take effect and thus provide for a shearing stroke of the blade 27. Thus a trip lever 41 (Fig. 1) pivoted intermediately of its length upon the casing 1, as indicated at 42, is connected at its lower end to the arm 20 by a link 43. The upper end portion of said lever is bent to overhang the casing and rigidly carries a control element 44, projecting some distance rearwardly of the lever to carry an adjusting screw 45. The forward portion of the control element is transversely shouldered at 46 for engagement by the hooked rear portion of a trip arm 47 pivoted at 48 on the rear portion of the die holder 26. The top face of the element 44 is beveled at 49 in proximity to the front end thereof, to adapt the arm 47 to ride up on said element, in returning to its normal latched position, after a forward actuation of the die holders.

Forwardly extending from the cover 2 is an elongated table 50, preferably of inverted channel form in cross section, said table, as illustrated, having its rear end surmounting a bracket 51 and bolted thereto, as indicated at 52 (Figs. 1 and 5). Any suitable support (not shown) may be provided for the forward end of said table, the length of which somewhat exceeds the maximum severed lengths of stock to be produced by the machine. Rigidly surmounting and substantially coextensive with said table is a slide-guide 53, correlated with the table to form a pair of opposed elongated grooves 54. Slidable on the guide 53 and engaging said grooves thereof is a block 55, whereon a rearwardly projecting arm 56 is pivoted on a pin 57 to undergo a limited rise and fall. The rear portion of said arm journals and rides upon a roller 58, resting on the slide-guide 53, near a lateral margin thereof. Adjacent to such roller, at the rear thereof, a rectangular bumper block 59 is pivoted on the arm 56, said block lying in the path of advance of the stock 30 and presenting a vertical face to the stock, for engagement by its end face. To guide the stock in its advance toward the block 59, a sheet metal guide 60 is laterally secured to the rear end portion of the slide-guide 53, and is bent to adapt its upper portion to extend above the advancing stock, the rear end portion of said upper portion being upwardly curved to deflect the stock downwardly, in case it tends to advance at too great a height.

When advancing stock acts through the bumper block 59 and arm 56 to slide the block 55 forwardly, this travel is further communicated to the dies and die holders by a tie rod 61, clamped against said block by a plate 62 and bolts 63 connecting said plate to the block. The rear end of said tie rod is rigidly attached to either die holder 25 or 26, and as shown is clamped upon the forward end of the holder 26 by a plate 64. The tie rod 61 is sufficiently long to afford its engagement with the block at numerous selective distances from the die holders, since, as will presently appear, the effective length of the rod is a vital factor in predetermining the equal lengths into which stock is to be severed. In any working position of the block 55 on the slide-guide 53, a block 65, serving to laterally deflect severed work is positioned for use between the block 55 and the roller 58. To maintain its sliding engagement with the slide-guide 53, the block 65 has portions 66 straddling the slide-guide and formed with ribs freely fitting in the grooves 54. When the roller 58 is advanced due to the thrust applied by advancing stock to the bumper block, a predetermined travel of such roller engages it with a forwardly ascending ramp 67 formed upon the rear end of the block 65, and the resulting upward travel of the roller swings the arm 56 upwardly until the bumper block 59 clears the advancing stock. Thereupon, the stock further advances beneath the bumper block until its front end engages a face 68 of the block 65, diagonal to the path of the stock and hence acting to laterally deflect the severed length of the stock to eject it or assist its ejection from the machine. The block 65 is adapted to be clamped firmly on the slide-guide 53 in proper coacting relation to the roller 58 by a bolt 69 adapted to draw together yielding opposite portions of said block, formed by partially severing the block vertically and in its direction of travel, as indicated at 70. As an additional provision for ejecting severed work from the machine it is preferred to mount upon the stock-guide 60, a rearwardly projecting bowed spring 71 (see Fig. 3) which is laterally deflected and stressed by the advancing stock, and consequently tends to laterally discharge the stock, when severed, from the machine.

Figures 2, 14:
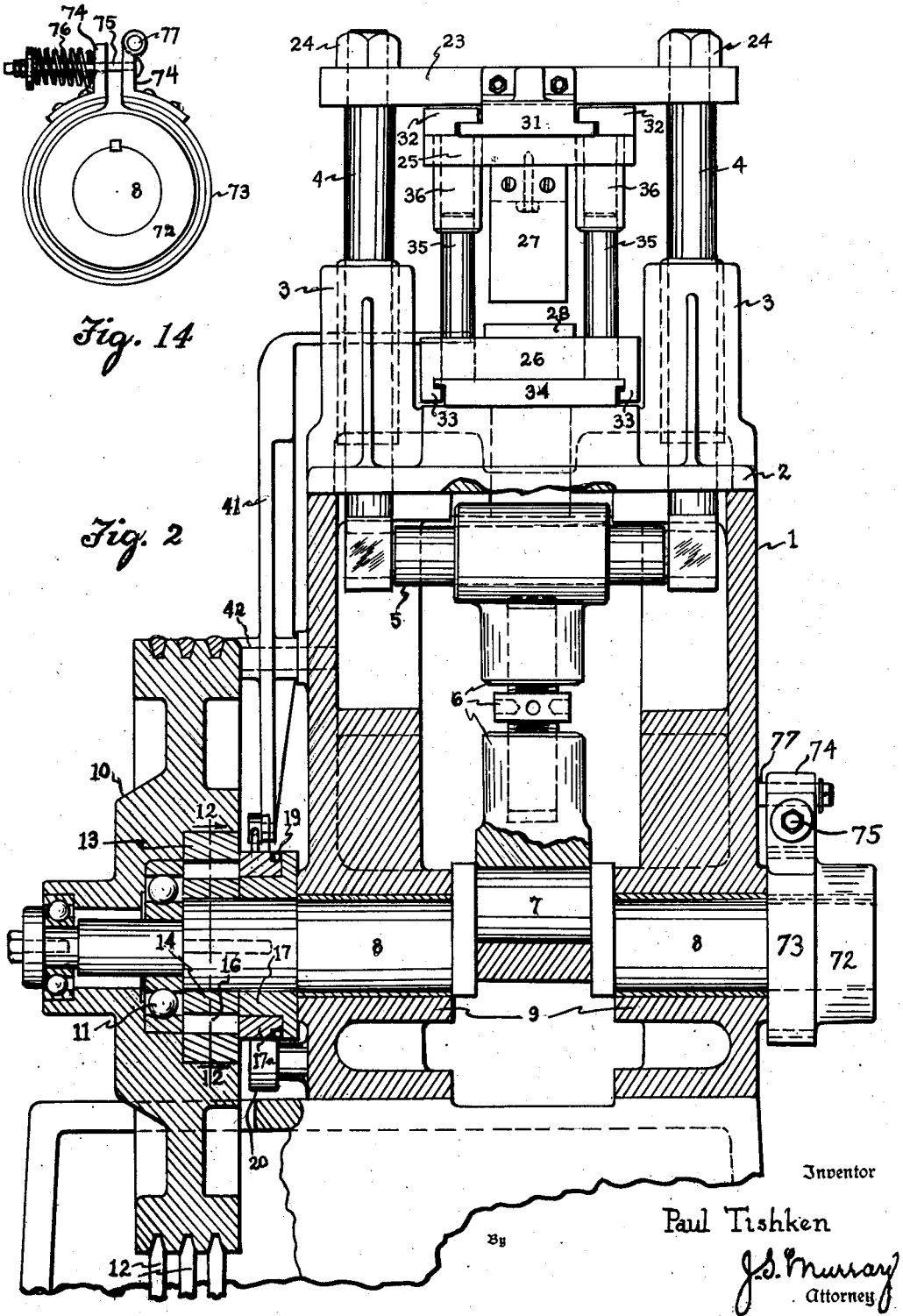
Fig. 2 is a vertical sectional view of the same, taken on the line 2—2 of Fig. 1.
Fig. 14 is an end view of a brake acting on the machine.

To assure prompt stopping of the shaft 8, as the drive thereto is cut off on completing a revolution, any suitable type of brake may be applied to such shaft. Thus, as shown in Figs. 1 and 14, a collar 72 is keyed on the end of said shaft remote from that carrying the pulley 10, and a brake band 73 peripherally engages such collar, the ends of said band carrying opposed lugs 74. A bolt 75 interconnects said lugs and further mounts a spring 76 urging the lugs toward each other, under predetermined pressure. A pin 77, securing one of said lugs to the casing 1, serves as an anchor for the described brake.

Such slugs or punchings as may be formed in the operation of the machine are adapted to discharge therefrom by way of a suitable inclined slug chute 78 having its inlet beneath the lower die holder.

In the operation of the described machine, the shearing blade 27 is normally raised, whereby stock may advance between such blade and the coacting lower dies 28. The block 55, with its trip arm 56, roller 58, and bumper block 59, is adjusted to establish a distance from the blade to the bumper block exactly equaling the length to which the stock is to be severed. Upon impact of the stock with the bumper block, the trip arm carrying block 55 immediately slides forward, imparting a like travel through the tie rod 61 to the dies and their holders. During the initial portion of such travel, the trip arm 47 takes effect on the lever 41 to rock the latter and trip the described clutch to establish a drive to the shaft 8 from the pulley 10. Thereupon said shaft completes a single revolution, effecting a working stroke of the blade 27 and its return to raised position. As the resulting shearing of the stock is completed, the roller 58 is actuated up the ramp 67, releasing the bumper block from the severed work. The severed stock is then either immediately ejected by the spring 71, or is ejected jointly by such spring and the block 65, when the diagonal face 68 of the latter is encountered by the stock.

Upon completion of a crank-shaft revolution, the lug 22 again encounters the clutch control arm 20, rocking the control ring 72a and consequently shifting the rollers 16 into the deeper ends of their pockets 15, to discontinue the drive.

The described cut-off control mechanism so eliminates any lost motion, in determining the length of severed stock, as to permit such determination to be very accurate. The action of the dies on the stock need not be limited to shearing, as perforating or forming operations may be also performed on the stock, either with or without a shearing operation. In employing the machine merely to perforate or otherwise deform advancing stock at equal intervals of its length, the block 65 for laterally deflecting sheared work would, of course, be eliminated and parts 55, 56, 57, 58, and 59 would require modification, according to the formation imparted to the stock. That is to say, a sheared end face of the stock could not in such case engage such a member as the bumper block 59, but some other member suited to engage a die-formed face could be mounted for sliding travel on the table 50 and released from the stock, after exercise of a tripping control, by a modified type of the block 65. For some purposes it may be desirable to shear the work, in one operation at several points, as when the lengths to be formed are quite short, this obviously involving merely a multiplication of the dies.

While lengths of stock may be manually fed to the machine, if desired, the feeding means will ordinarily be automatic and derived from some other machine (not shown) operating on the stock, in advance of the described cut-off machine. Thus, for example, the stock may be fashioned to a desired moulding form by a rolling machine, (not shown) the described cut-off machine receiving the moulding, as it advances from the rolling machine.

The invention is presented as including all such modifications and changes as come within the scope of the following claims.

What I claim is:

1. In a machine for performing die operations on elongated, advancing stock, a pair of opposed dies, normally spaced to admit such stock therebetween, holders for said dies, a mounting for such holders affording them sliding travel in and reversely to the direction of stock advance, means interconnecting the holders for sliding travel in unison, affording them a relative stock-engaging travel, power means for relatively actuating the holders to effect a die operation on the stock, a device controlling and normally cutting off the application of power to the power means, said device including a tripping lever, an arm pivoted on one of said holders hooked to engage said lever, whereby the lever is tripped to energize the power means responsive to a travel of such holder in the direction of advance of stock, and means carried by said lever for disengaging said arm from the lever upon a tripping actuation of the lever.

2. In a machine for performing die operations on elongated advancing stock, a pair of opposed dies, normally spaced to admit such stock therebetween; holders for said dies, a mounting for such holders affording them a sliding forward and back travel in the direction of stock advance, means for interconnecting the holders for sliding travel in unison, affording them a relative stock-engaging travel, power means for relatively actuating the holders to effect a die operation on the stock, a device controlling and normally cutting off the application of power to the power means, a trip mechanism effective on such device to apply power to the power means, an element predeterminedly spaced from the dies in the direction of stock advance and engageable by a die-formed face of the stock to advance said element in unison with the stock, a guide member for said element, and an actuating connection from said element to the trip mechanism adapted to effect an application of power to the power means, responsive to a predetermined advance of said element.

3. In a machine for performing die operations on elongated advancing stock, a pair of opposed dies, normally spaced to admit such stock therebetween, holders for said dies, a mounting for such holders affording them a forward and back travel in the direction of stock advance, means for interconnecting the holders for forward and back travel in unison, affording them a relative stock-engaging travel, power means for relatively actuating the holders to effect a die operation on the stock, a device controlling and normally cutting off the application of power to the power means, a trip mechanism effective on such device to apply power to the power means, an element predeterminedly spaced from the dies in the direction of stock advance and engageable by a die-formed face of the stock to advance said element in unison with the stock, a guide member for said element, an actuating connection from said element to one of the die holders, requiring such holders to advance in unison with said element, and an actuating connection from one of the die holders to said trip mechanism, adapted to effect an application of power to the power means, responsive to a predetermined advance of the die holders.

4. In a machine for performing die operations, as set forth in claim 3, means for varying the effective length of said actuating connection to vary the predetermined spacing of said element from the dies.

5. In a machine for performing die operations, as set forth in claim 3, a guide for directing stock into engagement with said element, interposed between the dies and said element.

6. In a machine for performing die operations, as set forth in claim 3, said element being yieldably retained in the path of the stock, means secured to said guide member, effective on said element, after a predetermined advance thereof, to shift it out of the path of the stock.

7. In a machine for performing die operations, as set forth in claim 3, said element being yieldably retained in the path of the stock, and means secured to said guide member, forwardly of said element and in the path of the stock for first shifting said element out of the path of the stock and then deflecting cut off stock laterally from said path.

8. In a machine for cutting elongated advancing stock into predetermined lengths, a pair of opposed dies, normally spaced to admit such stock therebetween, holders for such dies, a mounting for such holders affording them a forward and back travel in the direction of stock advance, means interconnecting the holders to undergo such travel in unison, said means affording them a relative stock-engaging travel, power means for relatively actuating the holders to effect a die operation on the stock, a device controlling and normally cutting off the application of power to the power means, a trip mechanism effective on such device to apply power to the power means, an element predeterminedly spaced from the dies in the direction of stock advance and engageable by a die-formed face of the stock to advance such element in unison with the stock, an arm carrying said element and extending forwardly therefrom, a slide-piece on which the forward end of said arm is pivoted, a guide, mounting said slide-piece for forward and back travel in the direction of stock advance, and two members, one attached to said guide between said element and the slide-piece and the other mounted on said arm, coacting upon a predetermined advance of said element by the stock, to rock said arm to a position disengaging said element from the stock.

9. In a machine for cutting elongated advancing stock into predetermined lengths, a pair of opposed dies, normally spaced to admit such stock therebetween, holders for such dies, a mounting for such holders affording them a forward and back travel in the direction of stock advance, means interconnecting the holders to undergo such travel in unison, said means affording them a relative stock-engaging travel, power means for relatively actuating the holders to effect a die operation on the stock, a device controlling and normally cutting off the application of power to the power means, a trip mechanism effective on such device to apply power to the power means, an element predeterminedly spaced from the dies in the direction of stock advance and engageable by a die-formed face of the stock to advance such element in unison with the stock, an arm carrying said element and extending forwardly therefrom, a slide-piece on which the forward end of said arm is pivoted, a guide, mounting said slide-piece for forward and back travel in the direction of stock advance, a roller mounted on said arm, and a member attached to the guide, between said element and the slide-piece, having two faces diverged to the path of the stock, one such face being engageable by the roller and acting through the roller and arm on said element to shift it clear of the stock, and the other being engageable by the cut off stock to deflect it from the normal stock path.

10. A die mechanism for operating on elongated advancing stock, comprising a pair of spaced, opposed die holders between which the stock advances, a mounting for such holders, affording them sliding travel in and reversely to the direction of stock advance, means interconnecting the holders for sliding travel in unison, affording them a relative stock-engaging travel, coacting dies carried by the die holders, and means yieldably urging said dies holders reversely to the advance of stock, and a stop carried by said mounting, limiting response of the holders to such urging means.

11. In a machine for performing die operations on elongated advancing stock, a pair of co-operating dies, a carriage for such dies, trackways for guiding the carriage in and reversely to the direction of stock advance, an element predeterminedly spaced from the dies in the direction of stock advance, and engageable by a die-formed face of the stock, an actuating connection from said element to the carriage, compelling advance of the carriage in unison with said element, means for energizing the dies in an operation on the stock as the carriage advances, means for automatically retracting the carriage and said element after completion of each die operation, and a slide-guide elongated in the direction of stock advance, said element being adjustable on such slide-guide to selectively vary its spacing from the dies, and the effective length of said actuating connection being correspondingly variable.

12. In a machine for performing die operations on elongated advancing stock, a pair of cooperating dies, a carriage for such dies, trackways for guiding the carriage in and reversely to the direction of stock advance, an element predeterminedly spaced from the dies in the direction of stock advance, and engageable by a die-formed face of the stock, an actuating connection from said element to the carriage, compelling advance of the carriage in unison with said element, means for energizing the dies in an operation on the stock as the carriage advances, means for automatically retracting the carriage and said element after completion of each die operation, a carrier for said element, normally positioning the element in the path of advancing stock, and a common means for guiding such carrier in travel induced by engagement of the stock with said element, and for affording the carrier an adjustment to vary the spacing of said element from the dies.

13. In a machine for performing die operations on elongated advancing stock, a pair of cooperating dies, a carriage for such dies, trackways for guiding the carriage in and reversely to the direction of stock advance, an element predeterminedly spaced from the dies in the direction of stock advance, and engageable by a die-formed face of the stock, an actuating connection from said element to the carriage, compelling advance of the carriage in unison with said element, means for energizing the dies in an operation on the stock as the carriage advances, cam means for moving said element from the path of the stock, responsive to a predetermined actuation of said element by the stock, and means for automatically retracting the carriage and said element, when said cam means has taken effect.

14. In a machine for performing die operations on elongated advancing stock, a pair of cooperating dies, a carriage for such dies, means for guiding the carriage in and reversely to the direction of stock advance, an element predeterminedly spaced from the dies in the direction of stock advance, and engageable by a die-formed face of the stock to effect an advance of such element in unison with the stock, an actuating connection from such element to the carriage, compelling advance of the carriage in substantial unison with such element, means for energizing the dies in an operation on the stock as the carriage advances, means in advance of said element and adjustable relative to said element in the direction of advance, for effecting disengagement of said element from the stock, and means for automatically retracting the carriage and said element upon such disengagement.

15. In a machine for performing die operations on elongated advancing stock, a pair of cooperating dies, a carriage for such dies, means for guiding the carriage in and reversely to the direction of stock advance, an element predeterminedly spaced from the dies in the direction of stock advance, and engageable by a die-formed face of the stock to effect an advance of such element in unison with the stock, an actuating connection from such element to the carriage, compelling advance of the carriage in substantial unison with such element, means for energizing the dies in an operation on the stock as the carriage advances, a roller connected to said element for travel therewith, a member providing a track for the roller, and means carried by such member and effective on the roller, upon a predetermined advance of the roller and connected element, disengaging said element from the stock, and means for automatically retracting the carriage and said element, upon such disengagement.

PAUL TISHKEN.